H. Koeller
Corn Planter.
No. 109,225. Patented Nov. 15. 1870.
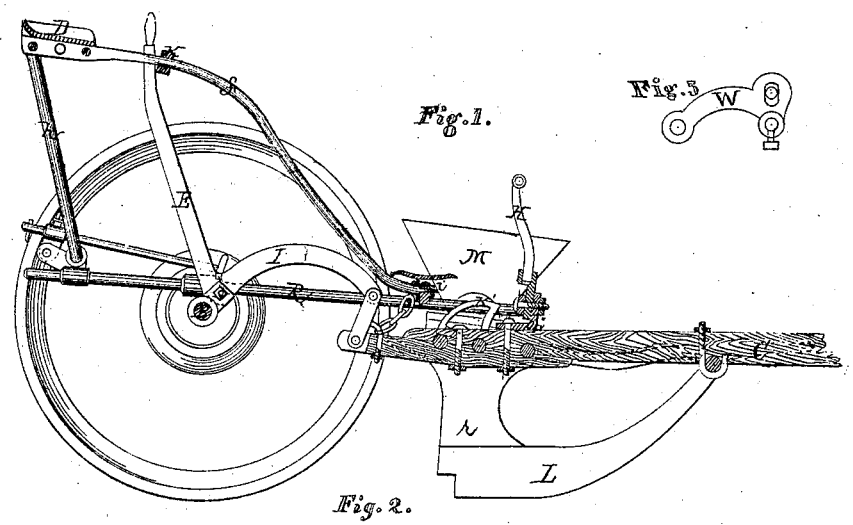
Fig. 1.
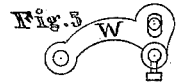
Fig. 5.
Fig. 2.
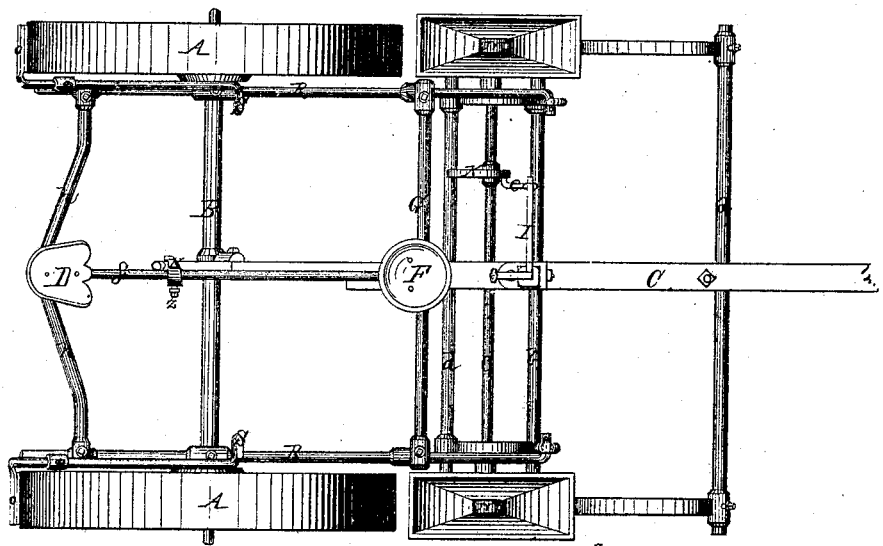
Fig. 3.
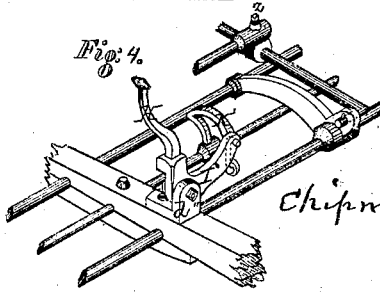
Fig. 4.
Witnesses
D. O. Kane
F. B. Curtis
Inventor
H. Koeller
Chipman, Hosmer & Co
Attorneys

UNITED STATES PATENT OFFICE.

HERMANN KOELLER, OF CAMP POINT, ILLINOIS.

IMPROVEMENT IN CORN-PLANTERS.

Specification forming part of Letters Patent No. 109,225, dated November 15, 1870.

*To all whom it may concern:*

Be it known that I, HERMANN KOELLER, of Camp Point, in the county of Adams and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my invention. Fig. 2 is a plan view of the same. Figs. 3 and 4 are details.

My invention relates to agricultural implements; and it consists in the construction and novel arrangement of devices intended to serve as a valuable and useful apparatus for planting grain.

This invention is designed to be an improvement on my seed-planter for which I obtained a patent on the 3d day of May, 1870.

A A represent the wheels of my machine, which are generally constructed of metal.

B represents the axle of the carriage.

C is the tongue, attached to the cross-bars *a*, *b*, *c*, and *d*, and secured by bolts and nuts. A seat, D, is secured to the upper of the rods *f* and *h* in rear of the main frame, upon which the driver is seated. In front of the driver's seat is an elbow-lever marked E, as shown on the drawings in Fig. 1, pivoted to the forked arm T, keyed on the axle B. It is also connected with the rear end of the tongue C. An adjustable stop, K, is keyed on the supporting-rod *f*, and serves as an aid in keeping said lever in place. This stop can be adjusted at any position on the rod by means of the set-screw *z*.

F is a seat for a boy, and is secured to the cross-bar G by the rod *f* and nut *i*.

H is a removable lever, intended to be operated by the boy from his seat. This lever fits into a quadrangular socket in the top of the elbow-lever I, which lever I is pivoted to the forked lug *d″*, and is removable at will.

At one end of the socket is a pitman, *e*, attached to the arm K′ on the shaft C. By actuating the lever H back and forth a movement is given to the arm K′ which causes the seed to be carried into the conduits and deposited in the furrows.

L represents markers.

The seed-boxes M are adjusted over the conduits *r* in the manner shown.

N N represent circular seed-feeders at each end of the transverse rod O, and secured by set-screws *z*. These feeders work in the bottoms of the seed-boxes M in the manner set forth in my patent of May 3, 1870.

R represents longitudinal side bars, which can be made of any desired length. The front ends of these side bars respectively are bent inward and passed through the slotted eye of the coupling-arm W, a full representation of which arm is shown on Fig. 5 of the drawings. By reason of the play allowed to the front end of the bar in said slot the covering-wheels are permitted to pass along on the ground, and are not lifted therefrom while the markers are passing an obstruction. The main object of adjusting the hook of the side bar in a slot instead of an opening of ordinary size and form is to aid the operator in planting on rough and uneven soil.

S S are foot-levers pivoted to the rear of the side bars, R. At the end of each of these levers is a scraper *o*, which works upon the face of the wheels, the object being to keep mud and dirt from clogging them while in motion. The scrapers are easily adjusted to the wheel.

It will be observed that the frame of my machine consists chiefly of metal rods, which are connected together by fastenings or couplings T. These couplings are blocks of metal, perforated in the proper direction for the passage of the rods, and provided with set-screws or keys *z*, whereby they are secured after due adjustment. The arrangement is such that the wheels can be brought nearer together, and the distance of the furrows and seed-boxes from each other can be varied to suit the hills.

I claim—

1. The slotted coupling-arm W, in combination with the side bars, R, and lifting apparatus, as described, as an improvement upon my patent of May 3, 1870.

2. In combination with the neap C, the elbow-lever I′, eccentric K′, and removable lever H, when constructed and arranged as specified, as an improvement upon my patent of May 3, 1870.

In testimony that I claim the above I have hereunto subscribed my name in the presence of two witnesses.

HERMANN KOELLER.

Witnesses:
GEORGE RHELL,
GEO. S. CAMPBELL.